(12) United States Patent
Yun et al.

(10) Patent No.: US 11,786,932 B2
(45) Date of Patent: Oct. 17, 2023

(54) WINDOW AND METHOD OF MANUFACTURING THE SAME

(71) Applicant: Samsung Display Co., Ltd., Yongin-si (KR)

(72) Inventors: Hyunkyung Yun, Yongin-si (KR); Jihyun Ko, Yongin-si (KR); Hyunseung Seo, Yongin-si (KR); Dongsung Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/476,634

(22) Filed: Sep. 16, 2021

(65) Prior Publication Data

US 2022/0266295 A1    Aug. 25, 2022

(30) Foreign Application Priority Data

Feb. 23, 2021    (KR) .................. 10-2021-0024228

(51) Int. Cl.
| | |
|---|---|
| *B05D 7/00* | (2006.01) |
| *B05D 3/02* | (2006.01) |
| *B05D 7/02* | (2006.01) |
| *B32B 17/10* | (2006.01) |
| *B05D 3/14* | (2006.01) |
| *B05D 5/08* | (2006.01) |
| *C09D 171/00* | (2006.01) |

(Continued)

(52) U.S. Cl.
CPC ............ *B05D 7/54* (2013.01); *B05D 3/0218* (2013.01); *B05D 3/142* (2013.01); *B05D 3/144* (2013.01); *B05D 5/083* (2013.01); *B05D 7/02* (2013.01); *B32B 17/10* (2013.01); *C08G 65/336* (2013.01); *C09D 171/00* (2013.01); *B32B 27/08* (2013.01); *B32B 2255/10* (2013.01); *B32B 2255/26* (2013.01); *B32B 2457/20* (2013.01)

(58) Field of Classification Search
CPC .... C08G 65/336; C09D 171/00; C03C 17/30; C03C 17/3405; C03C 17/42; B05D 7/54; B05D 3/0218; B05D 3/142; B05D 3/144; B05D 5/083
See application file for complete search history.

(56) References Cited

U.S. PATENT DOCUMENTS 10,174,222 B2 * 1/2019 Park ................. H01L 51/0097
10,329,192 B2   6/2019 Kim et al.
10,584,223 B2 * 3/2020 McMillan ............ H01L 33/58
(Continued)

FOREIGN PATENT DOCUMENTS

KR    10-2015-0024271 B1    5/2015
KR    10-2018-0056870 B1    5/2018
(Continued)

OTHER PUBLICATIONS

English Abstract of KR 10-2018-0056870.
(Continued)

*Primary Examiner* — Michael P Wieczorek
(74) *Attorney, Agent, or Firm* — CANTOR COLBURN LLP

(57) ABSTRACT

A method of manufacturing a window includes aging a window substrate for 48 hours to 72 hours, subjecting the aged window substrate to a plasma, and forming an anti-fingerprint layer on the plasma-treated window substrate.

16 Claims, 10 Drawing Sheets

(51) Int. Cl.
    *B32B 27/08*     (2006.01)
    *C08G 65/336*     (2006.01)

(56) References Cited

U.S. PATENT DOCUMENTS

| | | | | |
|---|---|---|---|---|
| 2010/0015453 | A1* | 1/2010 | Yamaguchi | C08G 65/3255 428/428 |
| 2015/0309216 | A1* | 10/2015 | Fournand | G02B 1/18 427/536 |
| 2019/0143638 | A1* | 5/2019 | Park | B32B 7/02 361/820 |
| 2019/0382613 | A1* | 12/2019 | Ito | C09D 175/04 |
| 2020/0257338 | A1 | 8/2020 | Park et al. | |

FOREIGN PATENT DOCUMENTS

| | | |
|---|---|---|
| KR | 101856870 B1 | 6/2018 |
| KR | 10-2018-0089172 A | 8/2018 |
| KR | 10-2020-0098758 A | 8/2020 |

OTHER PUBLICATIONS

English Abstract of KR 10-2018-0089172.
Lu Zhu, et al., Surface & Coatings Technology 202 (2008) 1966-1974.

\* cited by examiner

WINDOW AND METHOD OF MANUFACTURING THE SAME

CROSS-REFERENCE TO RELATED APPLICATION

This application claims priority to, and the benefit under 35 U.S.C. Section 119 of, Korean Patent Application No. 10-2021-0024228, filed on Feb. 23, 2021, in the Korean Intellectual Property Office, the content of which is herein incorporated by reference in its entirety.

BACKGROUND

1. Field

One or more embodiments relate to a window and a method of manufacturing the same.

2. Description of the Related Art

Various mobile display devices are used, and such display devices may include a display panel that provides an image and a window that protects the display panel.

The window may include a coating layer that protects the display panel from contamination sources such as oil, fingerprints, and various foreign matters.

SUMMARY

According to one or more embodiments, following an aging process on a window substrate, the aged window substrate is subject to a plasma treatment to increase the efficiency of the plasma treatment. Additional aspects will be set forth in part in the description which follows and, in part, will be apparent from the description, or may be learned by a practice of the presented embodiments of the disclosure.

According to one or more embodiments, a method of manufacturing a window includes aging a window substrate for 48 hours to 72 hours, subjecting the aged window substrate to a plasma, and forming an anti-fingerprint layer on the plasma-treated window substrate.

According to an embodiment, the aging of the window substrate may be performed at a temperature of about 20° C. to about 100° C.

According to an embodiment, the aging of the window substrate may be performed at a humidity of about 50% to about 100%.

According to an embodiment, the subjecting of the window substrate to the plasma may include subjecting the aged window substrate to a plasma including oxygen.

According to an embodiment, the subjecting of an aged window substrate to the plasma, or optionally, a plasma including oxygen, may be performed for about 30 seconds to about 90 seconds.

According to an embodiment, the anti-fingerprint layer may include a structure including a silazane group bonded to a perfluoropolyether (PFPE).

According to an embodiment, the anti-fingerprint layer may include a compound represented by Formula 1:

$$(PFPE)_x\text{-Si-}[(NH\text{-}R)_n\text{-}NH_2]_y,\qquad \text{Formula 1}$$

wherein, in Formula 1, PFPE may be a perfluoropolyether group, R may be a $C_2$-$C_{10}$ alkylene group, x and y may be each independently an integer from 1 to 3, x+y=4, and n may be an integer from 1 to 5.

According to an embodiment, a ratio of fluorine atoms to a total number of atoms on a surface of the anti-fingerprint layer may be about 0.7:1 or more.

According to an embodiment, a water contact angle of the anti-fingerprint layer may be about 100 degrees or more.

According to an embodiment, the window substrate may include a polymer resin.

According to an embodiment, the method may further include forming a hard coating layer on the window substrate prior to the aging of the window substrate.

According to an embodiment, the hard coating layer may include at least one of an acryl compound, a silsesquioxane compound, an epoxy compound, or a urethane compound.

According to an embodiment, a window includes a window substrate, and an anti-fingerprint layer on the window substrate, the anti-fingerprint layer having a structure including a silazane group bonded to a perfluoropolyether (PFPE).

According to an embodiment, the anti-fingerprint layer may include a compound represented by Formula 1 below:

$$(PFPE)_x\text{-Si-}[(NH\text{-}R)_n\text{-}NH_2]_y,\qquad \text{Formula 1}$$

wherein, in Formula 1, PFPE may be a perfluoropolyether group, R may be a $C_2$-$C_{10}$ alkylene group, x and y may be each independently an integer from 1 to 3, x+y=4, and n may be an integer from 1 to 5.

According to an embodiment, a ratio of fluorine atoms to a total number of atoms on a surface of the anti-fingerprint layer may be about 0.7:1 or more.

According to an embodiment, a water contact angle of the anti-fingerprint layer may be about 100 degrees or more.

According to an embodiment, the window substrate may include a polymer resin.

According to an embodiment, the window may further include a hard coating layer disposed between the window substrate and the anti-fingerprint layer.

According to an embodiment, the hard coating layer may include at least one of an acryl compound, a silsesquioxane compound, an epoxy compound, or a urethane compound.

Other aspects, features and advantages of the disclosure will become better understood through the accompanying drawings, the claims, and the detailed description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
FIGS. 1 to 3 are schematic representations of steps for a method of manufacturing a window, according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Rather, these embodiments are provided so that this disclosure will be thorough and complete, and will fully convey the scope of the invention to those skilled in the art. Accordingly, the embodiments are merely described below, by referring to the figures, to explain aspects of the present description.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." As used herein, the term "and/or" includes any and all combinations of one or more of the associated listed items. Throughout the disclosure, the expression "at least one of a, b, or c" indicates only a, only b, only c, both a and b, both a and c, both b and c, all of a, b, and c, or variations thereof. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that although the terms "first," "second," etc. may be used herein to describe various elements, components, regions, layers or sections, and these elements, components, regions, layers, or sections, should not be limited by these terms. These terms are only used to distinguish one element from another.

It will be further understood that, when a layer, region, or element is referred to as being "on" another layer, region, or element, it can be directly or indirectly on the other layer, region, or element. That is, for example, intervening layers, regions, or elements may be present. In contrast, when an element is referred to as being "directly on" another element, there are no intervening elements present.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims. Also, sizes of elements in the drawings may be exaggerated or reduced for convenience of explanation. In addition, because sizes and thicknesses of elements in the drawings are arbitrarily illustrated for convenience of explanation, the disclosure is not limited thereto.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the following embodiments, the term "in a plan view" means seeing a target portion from above, and the term "in a cross-sectional view" means seeing a vertically cut cross-section of a target portion from side. In the following embodiments, the term "overlapping" may include overlapping "in a plan view" and "in a cross-sectional view."

Hereinafter, embodiments will be described in detail with reference to the accompanying drawings. When describing embodiments with reference to the accompanying drawings, the same or corresponding elements are denoted by the same reference numerals.

Figure 2:
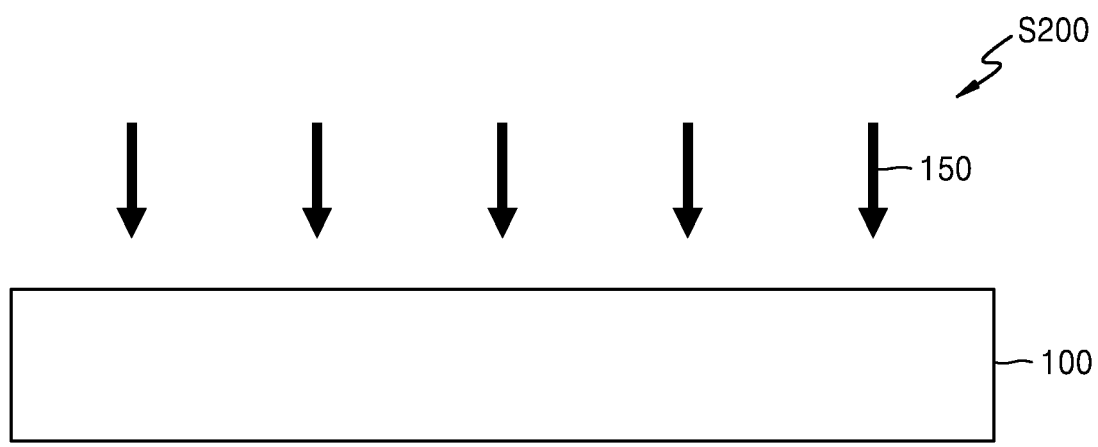
Figure 3:
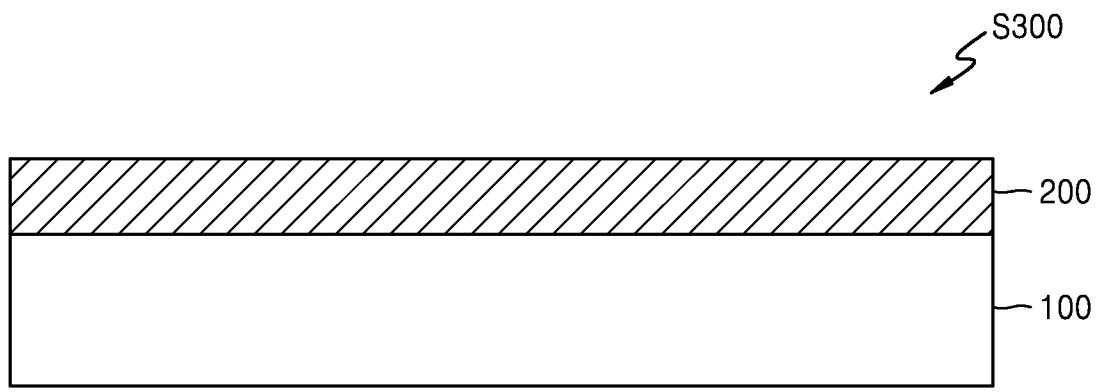

FIGS. 1 to 3 are schematic representations of steps for a method of manufacturing a window, according to an embodiment. Hereinafter, the method of manufacturing the window will be sequentially described with reference to FIGS. 1 to 3.

Referring to FIGS. 1 to 3, the method of manufacturing the window, according to an embodiment, may include aging a window substrate 100 (S100), subjecting the aged window substrate 100 to a plasma 150 (S200), and forming an anti-fingerprint layer 200 on the plasma-treated window substrate (S300).

Referring to FIG. 1, the window substrate 100 may be aged. According to an embodiment, the window substrate 100 may include a polymer resin. For example, the window substrate 100 may include at least one of polyethersulfone, polyacrylate, polyether imide, polyethylene naphthalate, polyethylene terephthalate, polyphenylene sulfide, polyarylate, polyimide, polycarbonate, cellulose triacetate, cellulose acetate propionate, polyarylene ether sulfone, benzocyclobutene, hexamethyldisiloxane, or a polymethacrylate such as polymethyl methacrylate.

According to an embodiment, the window substrate 100 may be aged at a temperature of about 20° C. to about 100° C., and a relative humidity of about 50% to about 100% for about 48 hours to about 72 hours.

Alternatively, according to an embodiment, the window substrate 100 may be aged at a temperature of about 0° C. to about 90° C. and a relative humidity of about 80% to about 100% for about 48 hours to about 72 hours.

According to an embodiment, the window substrate 100 may be aged in a chamber. For example, the window substrate 100 may be aged in a constant temperature and/or humidity chamber.

When the window substrate is aged at a temperature of less than 20° C. (or less than 0° C.), the aging time may increase, and thus, the processing efficiency may decrease. When the window substrate is aged at a temperature of greater than 100° C. (or greater than 90° C.), the window substrate including a polymer resin may be damaged. Therefore, the window substrate 100 is aged at a temperature of 20° C. to 100° C. (or 0° C. to 90° C.), such that the processing efficiency is improved and the damage to the window substrate 100 is prevented or minimized.

When the window substrate is aged at a relative humidity of less than 50% (or less than 80%), the aging time may increase, and thus, the processing efficiency may decrease. Therefore, the window substrate 100 may be aged at a relative humidity of 50% to 100% (or 80% to 100%) such that the processing efficiency is acceptable.

When the aging time for the window substrate is less than 48 hours, the aging time may be insufficient, and thus, the durability of the manufactured window may decrease. On the other hand, when the aging time for the window substrate is greater than 72 hours, the aging time may increase, and thus, the processing efficiency for providing a suitable window may decrease. Therefore, the window substrate 100 is aged for 48 hours to 72 hours such that the durability of the window is improved and the processing efficiency is operationally acceptable.

The window substrate 100 is aged at a temperature of 20° C. to 100° C. and a relative humidity of 50% to 100% for 48 hours to 72 hours, such that the amount of moisture absorption on the surface of the window substrate 100 increases. Specifically, when the window substrate 100 is aged at a temperature of 20° C. to 100° C. and a relative humidity of 50% to 100% for 48 hours to 72 hours, the surface of the window substrate 100 absorbs moisture, thereby an increase in the amount of moisture on the surface of the window substrate 100 is observed. Because the amount of moisture on the surface of the window substrate 100 increases, the surface treatment efficiency for the aged window substrate 100 may be improved. That is, the efficiency of the process of subjecting the aged window substrate 100 to a plasma, which will be described later, may be improved.

Referring to FIG. 2, after the aging of the window substrate 100, the aged window substrate 100 is subjected to a plasma 150.

According to an embodiment, the subjecting of the window substrate 100 to a plasma 150 may include subjecting the aged window substrate 100 to a plasma including oxygen ($O_2$). For example, oxygen may be used as a discharge gas for plasma generation.

According to an embodiment, the subjecting of the window substrate 100 to a plasma 150 may include subjecting the aged window substrate 100 to a plasma including nitrogen ($N_2$). For example, nitrogen may be used as a discharge gas for plasma generation.

According to an embodiment, the subjecting of the window substrate 100 to a plasma 150 may include a plasma that includes a mixture of oxygen and nitrogen. Alternatively, according to an embodiment, the subjecting of the window substrate 100 to a plasma 150 may include subjecting the aged window substrate 100 to an oxygen plasma and then a nitrogen plasma, or a nitrogen plasma then an oxygen plasma.

The plasma treatment is shown by the inventors to modify the surface of the window substrate 100. Specifically, according to an embodiment, in the subjecting of the window substrate 100 to a plasma 150 as described above, e.g., a plasma treatment using oxygen, and optionally nitrogen, the oxygen composition of the surface of a modified window substrate may increase such that the surface of the window substrate becomes more hydrophilic.

According to an embodiment, the subjecting of the window substrate 100 to a plasma that includes oxygen, the surface of the aged window substrate 100 may be subjected to the oxygen plasma for 30 seconds to 90 seconds, 50 seconds to 90 seconds, or 60 seconds to 90 seconds.

When the subjecting the aged window substrate 100 to an oxygen plasma is less than 30 seconds, or less than 50 seconds, the plasma subjecting time is too short, and thus, a portion of the window substrate may not attain sufficient modification, e.g. may not become hydrophilic enough, or a more non-uniform surface modification may result. Consequently, the subsequent deposition of the anti-fingerprint layer 200, which will be described later, may be affected, e.g., the process efficiency of depositing the anti-fingerprint layer 200 may be reduced. On the other hand, when the time to irradiate the aged window substrate 100 with the plasma 150 is greater than 90 seconds, the plasma irradiation time may increase, and thus, the processing efficiency may decrease. Consequently, the deposition efficiency of the process of depositing the anti-fingerprint layer 200, which will be described later, may be reduced.

In the case of subjecting of the aged window substrate 100 to a plasma that includes oxygen for 30 seconds to 90 seconds, hydrophilic functional groups may be formed on a surface of the window substrate, and therefore, the surface of the window substrate may be become more hydrophilic. In addition, the inventors have observed that the surface roughness of a plasma-treated window substrate increases, and thus, the surface area of a modified window substrate is increased, and the deposition efficiency of the process of depositing the anti-fingerprint layer 200 may be improved.

According to an embodiment, by aging the window substrate 100 before irradiating the window substrate 100 with the plasma (for example, oxygen plasma), the efficiency of the plasma (for example, oxygen plasma) irradiation process may be improved. Specifically, in the case of aging the window substrate 100 before irradiating the window substrate 100 with the plasma (for example, oxygen plasma), the oxygen composition of the surface of the window substrate 100 after the plasma (for example, oxygen plasma) irradiation may be increased and the surface of the window substrate 100 may have more hydrophilicity, compared with the case of not aging the window substrate 100 before irradiating the window substrate 100 with the plasma (for example, oxygen plasma).

Referring to FIG. 3, after the aged window substrate 100 is subjected to a plasma 150, the anti-fingerprint layer 200 may be formed on the plasma-treated window substrate.

According to an embodiment, the anti-fingerprint layer 200 may be formed directly on the plasma-treated window substrate.

According to an embodiment, the anti-fingerprint layer 200 may be formed on the plasma-treated window substrate by using electron-beam physical vapor deposition. Alternatively, according to an embodiment, the anti-fingerprint layer 200 may be formed on the plasma-treated window substrate by using physical vapor deposition (PVD) or chemical vapor deposition (CVD).

According to an embodiment, the anti-fingerprint layer 200 may be formed by using a compound (or a composition including the compound) in which a silazane group is bonded to perfluoropolyether (PFPE). Therefore, the anti-fingerprint layer 200 may include a compound with a silazane group bonded to PFPE. In this case, the silazane may have a structure including a silicon (Si) atom and an amino nitrogen linked to the silicon atom. For example, silazane may be provided in a structure including one or more amino nitrogens covalently bonded to a silicon (Si) atom. According to an embodiment, the silazane may have a structure including a silicon (Si) atom and an amino nitrogen directly linked to each other.

According to an embodiment, the anti-fingerprint layer 200 may be manufactured by using a compound represented by Formula 1 below. For example, the anti-fingerprint layer 200 may be manufactured by using a mixture of a solvent and a compound represented by Formula 1. Therefore, the anti-fingerprint layer 200 may include a compound represented by Formula 1.

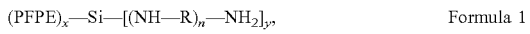

Formula 1

In Formula 1, PFPE is a perfluoropolyether group, R is an alkylene group having from 2 to 10 carbon atoms, x and y are each independently an integer from 1 to 3, x+y=4, and n is an integer from 1 to 5.

According to an embodiment, when three PFPEs are bonded (x=3, y=1; for example, directly bonded) to Si in Formula 1, one [(NH—R)$_n$—NH$_2$] may be bonded (for example, directly bonded) to Si. When two PFPEs are bonded (for example, directly bonded) to Si, two [(NH—R)$_n$—NH$_2$](s) may be bonded (for example, directly bonded) to Si. When one PFPE is bonded (x=1, y=3; for example, directly bonded) to Si, three [(NH—R)$_n$—NH$_2$](s) may be bonded (for example, directly bonded) to Si. That is, because Si has four binding sites, PFPE may be bonded to the remaining sites except for the site to which [(NH—R)$_n$—NH$_2$] is bonded among the four binding sites.

At this time, the solvent may include alcohols such as methanol, ethanol, propyl alcohol, isopropyl alcohol, n-butyl alcohol, isobutyl alcohol, sec-butyl alcohol, t-butyl alcohol, and diacetone alcohol, glycol ethers such as ethylene glycol monomethyl ether, ethylene glycol monoethyl ether, propylene glycol monomethyl ether, and propylene glycol monoethyl ether, ketones such as acetone, methyl ethyl ketone, methyl isobutyl ketone, and acetylacetone, esters such as ethyl acetate, butyl acetate, and ethyl acetoacetate, xylene, toluene, 7H-perfluoro-1-heptanal, or methylhydrazine. These may be used alone or in combination of two or more solvents. However, the disclosure is not limited thereto.

According to an embodiment, a ratio of fluorine atoms to the total number of atoms on the surface of the anti-fingerprint layer 200 may be 0.7:1 or more. For example, a ratio of fluorine atoms to the total number of atoms on the surface of the anti-fingerprint layer 200 may be 0.72:1 or more, 0.74:1 or more, 0.76:1 or more, or 0.78:1 or more. Because a ratio of fluorine atoms to the total number of atoms on the surface of the anti-fingerprint layer 200 is 0.7 or more, fingerprint resistance and/or alcohol resistance of the anti-fingerprint layer 200 may be improved. In addition, because fingerprint resistance of the anti-fingerprint layer 200 is improved, alcohol resistance of the window may be improved as well.

Figure 4:
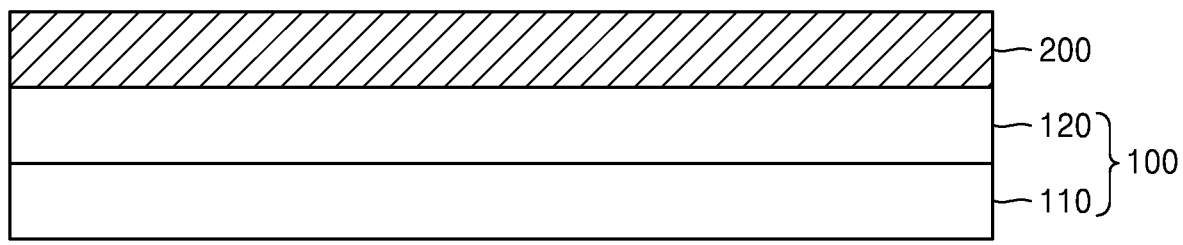
FIG. 4 is a schematic cross-sectional representation of a window, according to an embodiment.

FIG. 4 is a diagram schematically illustrating a method of manufacturing a window, according to an embodiment. The embodiment of FIG. 4 differs from the embodiment of FIGS. 1 to 3 in that a window substrate 100 includes a first window substrate 110 and a second window substrate 120. In FIG. 4, the same reference numerals as those in FIGS. 1 to 3 denote the same members, and redundant descriptions thereof are omitted.

Referring to FIG. 4, the window substrate 100 according to an embodiment may include a first window substrate 110 and a second window substrate 120. According to an embodiment, the first window substrate 110 and the second window substrate 120 may be or include different materials than the other. According to an embodiment, the first window substrate 110 and the second window substrate 120 may include the same material.

Although not illustrated, the window substrate 100 may further include a third window substrate and/or a fourth window substrate.

Figure 5:
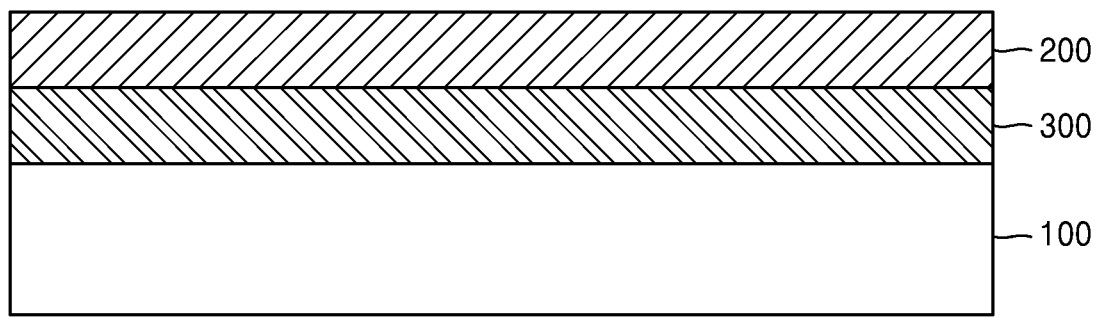
FIG. 5 is a schematic cross-sectional representation of a window, according to an embodiment.

FIG. 5 is a diagram schematically illustrating a method of manufacturing a window, according to an embodiment. The embodiment of FIG. 5 differs from the embodiment of FIGS. 1 to 3 in that a hard coating layer 300 is formed between a window substrate 100 and an anti-fingerprint layer 200. In FIG. 5, the same reference numerals as those in FIGS. 1 to 3 denote the same members, and redundant descriptions thereof are omitted.

Referring to FIG. 5, the hard coating layer 300 may be formed or disposed between the window substrate 100 and the anti-fingerprint layer 200. According to an embodiment, the hard coating layer 300 compensates for a low hardness of the window substrate 100, for example, which may include or be a relatively soft polymer resin material. The hard coating layer 300 may have a hardness greater than that of the window substrate 100 and may be formed directly on the window substrate 100.

According to an embodiment, the hard coating layer 300 may include an organic material and/or an inorganic material. According to an embodiment, the hard coating layer 300 may include at least one of an acryl compound, a silsesquioxane compound, an epoxy compound, or a urethane compound. As used herein, the term "acryl compound" is inclusive of compounds including a (meth)acryl group, i.e., a group of the formula —CH═CRC(═O)O—R' wherein R is hydrogen or methyl, and R' is hydrogen or alkyl, for example a $C_1$-$C_{10}$ alkyl, as well as oligomeric or polymer products of compounds including a (meth)acryl group. Similarly, a silsesquioxane compound, an epoxy compound, and a urethane compound is inclusive of oligomeric or polymer products of compounds including silsesquioxane group, an epoxy group, and a urethane group, respectively. Although not illustrated, the hard coating layer 300 may include a multi-hard layer coating such as a first hard coating layer and a second hard coating layer. In this case, the first hard coating layer and the second hard coating layer may or include different materials than the other. Alternatively, the first hard coating layer and the second hard coating layer may include the same material.

Also, although not illustrated, the window substrate 100 may include a first window substrate and/or a second window substrate, and the hard coating layer 300 may include a first hard coating layer and/or a second hard coating layer.

According to an embodiment, when the hard coating layer 300 is formed on the window substrate 100, the hard coating layer 300 may be aged, the aged hard coating layer is then subjected to a plasma, and an anti-fingerprint layer 200 may be formed on the plasma-treated hard coating layer.

According to an embodiment, an anti-fingerprint layer 200 may be formed directly on the plasma-treated hard coating layer.

According to an embodiment, the window may be provided in a structure illustrated in FIG. 3. For example, the window may include the window substrate 100 and the anti-fingerprint layer 200 on the window substrate 100.

Alternatively, according to an embodiment, the window may be provided in a structure illustrated in FIG. 4. For example, the window may include the window substrate 100, which includes the first window substrate 110 and the second window substrate 120, and the anti-fingerprint layer 200 on the window substrate 100.

Alternatively, according to an embodiment, the window may be provided in a structure illustrated in FIG. 5. For example, the window may include the window substrate 100, the hard coating layer 300, and the anti-fingerprint layer 200, which are sequentially stacked. However, the disclosure is not limited thereto. The window substrate 100 may include a first window substrate 110 and/or a second window substrate 120, and the hard coating layer 300 may include a first hard coating layer and/or a second hard coating layer.

Figure 6:
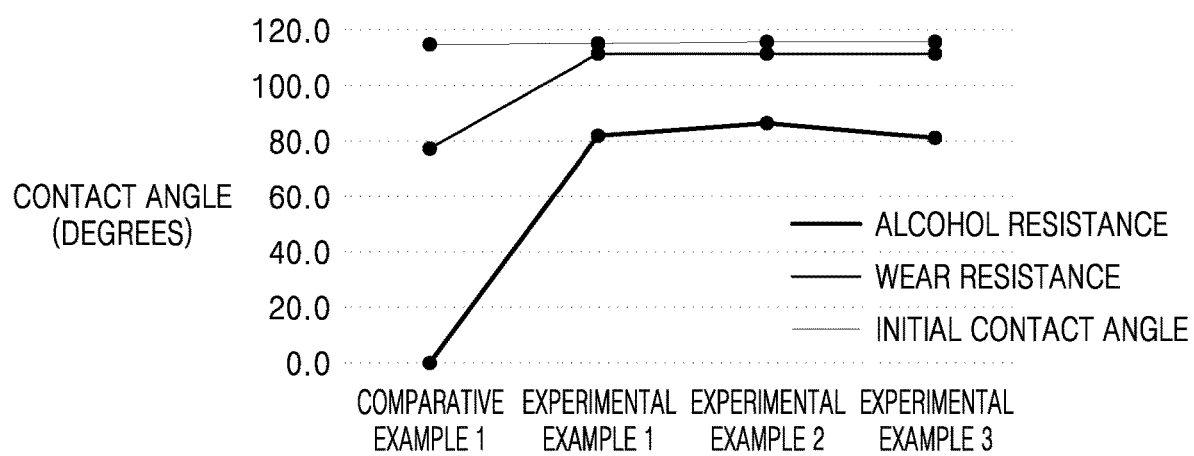
FIG. 6 is a plot of water contact angle in Comparative Example 1, and Experimental Examples 1, 2 and 3.

FIG. 6 is a plot showing o water contact angle in Comparative Example 1 and Experimental Examples 1 to 3.

In Comparative Example 1, a non-aged window substrate was subjected to a plasma that includes oxygen for 60 seconds, and an anti-fingerprint layer including Si—OX (X: methoxy, ethoxy, etc.) was formed on the window substrate. Specifically, in Comparative Example 1, the anti-fingerprint layer was formed by using a compound in which PFPE was bonded to Si—OX. Accordingly, the anti-fingerprint layer of Comparative Example 1 may have a structure including PFPE bonded to Si—OX.

In Experimental Example 1, a window substrate was aged at a temperature of 85° C. and a relative humidity of 85% for 48 hours, the aged window substrate was subjected to the same plasma as in Comparative Example 1 for 60 seconds, and an anti-fingerprint layer including Si—OX (X: methoxy, ethoxy, etc.) was formed on the window substrate. Specifically, in Experimental Example 1, the anti-fingerprint layer was formed by using a compound in which PFPE was bonded to Si—OX. Accordingly, the anti-fingerprint layer of Experimental Example 1 may have a structure including PFPE bonded to Si—OX.

In Experimental Example 2, a window substrate was aged at a temperature of 25° C. and a relative humidity of 85% for 72 hours, the aged window substrate was subjected to the same plasma for 60 seconds as in Example 1, and an anti-fingerprint layer including Si—OX (X: methoxy, ethoxy, etc.) was formed on the window substrate. Specifically, in Experimental Example 2, the anti-fingerprint layer was formed by using a compound in which PFPE was bonded to Si—OX. Accordingly, the anti-fingerprint layer of Experimental Example 2 may have a structure including PFPE bonded to Si—OX.

In Experimental Example 3, a window substrate was aged at a temperature of 25° C. and a relative humidity of 85% for 48 hours, the aged window substrate was subjected to the same plasma for 60 seconds as in Example 1, and an anti-fingerprint layer including Si—OX (X: methoxy, ethoxy, etc.) was formed on the window substrate irradiated. Specifically, in Experimental Example 3, the anti-fingerprint layer was formed by using a compound in which PFPE was bonded to Si—OX. Accordingly, the anti-fingerprint layer of Experimental Example 3 may have a structure including PFPE bonded to Si—OX.

The window of Comparative Example 1 and the windows of Experimental Examples 1, 2, and 3 were tested for water contact angle evaluation, wear resistance evaluation, and alcohol resistance evaluation. The inventors observed that if the water contact angle of the anti-fingerprint layer is less than 95 degrees, it was determined that the window was unacceptable. In contrast, if the water contact angle of the anti-fingerprint layer was 95 degrees or more, it was determined that the evaluation criteria were acceptable or satisfied.

Water contact angle evaluation was performed in the following manner: 3 microliters (µl) of water was dropped on a surface of the anti-fingerprint layer. An initial water contact angle of the anti-fingerprint layer was measured on a surface that was not surface modified either chemically or physically. A water contact angle was then measured for each Example 1 to 3 following specific surface testing as described follows. For the wear resistance evaluation, the anti-fingerprint layer was rubbed 3,000 times (40 times/min) by using a 1-kg rubber eraser, and then the water contact angle of the anti-fingerprint layer was measured. Also, for alcohol resistance evaluation, the anti-fingerprint layer was rubbed 3,000 times (rate of 40 times/min) under ethyl alcohol conditions by using a 1-kg rubber eraser, and then the water contact angle of the anti-fingerprint layer was measured.

Referring to FIG. 6, it is confirmed that the initial water contact angles of Comparative Example 1 and Experimental Examples 1 to 3 are each 95 degrees or more.

In the case of Comparative Example 1, as a result of the wear resistance evaluation, the water contact angle was measured to be 78 degrees. Therefore, because Comparative Example 1 has a wear resistance, water contact angle of less than 95 degrees, it is confirmed that Comparative Example 1 does not satisfy the evaluation criteria (i.e., a water contact angle of 95 degrees or more). In contrast, in the case of Experimental Examples 1, 2, and 3, following the wear resistance evaluation, the water contact angle was measured to be 100 degrees. Therefore, it is confirmed that Experimental Examples 1, 2, and 3 each satisfy the evaluation criteria (i.e., 95 degrees or more).

Accordingly, in the case of aging the window substrate before subjecting the window substrate to a plasma (for example, a plasma including oxygen), it is confirmed that the wear resistance of the anti-fingerprint layer formed on the window substrate is improved in comparison to a window substrate that was not aged. Accordingly, in the case of aging the window substrate at a temperature of 20° C. to 100° C. and a relative humidity of 50% to 100% for 48 hours to 72 hours before subjecting the window substrate to a plasma (for example, oxygen plasma), it is confirmed that the wear resistance of the anti-fingerprint layer formed on the window substrate is improved in comparison to a window substrate that was not aged. For example, it can be seen that the wear resistance of the anti-fingerprint layer is improved by about 40% when the window substrate is aged under the above conditions in comparison to a window substrate that was not aged.

According to an embodiment, when the window substrate is aged at a temperature of 20° C. to 100° C., and a relative humidity of 50% to 100% for 48 hours to 72 hours, the amount of moisture absorption on the surface of the window substrate may increase. Also, when the amount of moisture absorption on the surface of the window substrate increases, the efficiency of the plasma-treatment on the aged window substrate (for example, a plasma including oxygen) may also be improved, for example, the process for modifying the surface of the window substrate to become more hydrophilic may be improved. Also, when the efficiency of the plasma treatment process (for example, a plasma including oxygen) is improved, the surface roughness of the window substrate is improved and the surface area of the window substrate is increased, such that the deposition efficiency of the anti-fingerprint layer may be improved. Therefore, when the window substrate is aged at a temperature of 20° C. to 100° C., and a relative humidity of 50% to 100% for 48 hours to 72 hours, the surface area of the window substrate may increase, and thus, the efficiency of the process of depositing the anti-fingerprint layer on the window substrate may be improved. Moreover, the wear resistance of the anti-fingerprint layer formed on the window substrate may be improved.

Figure 7:
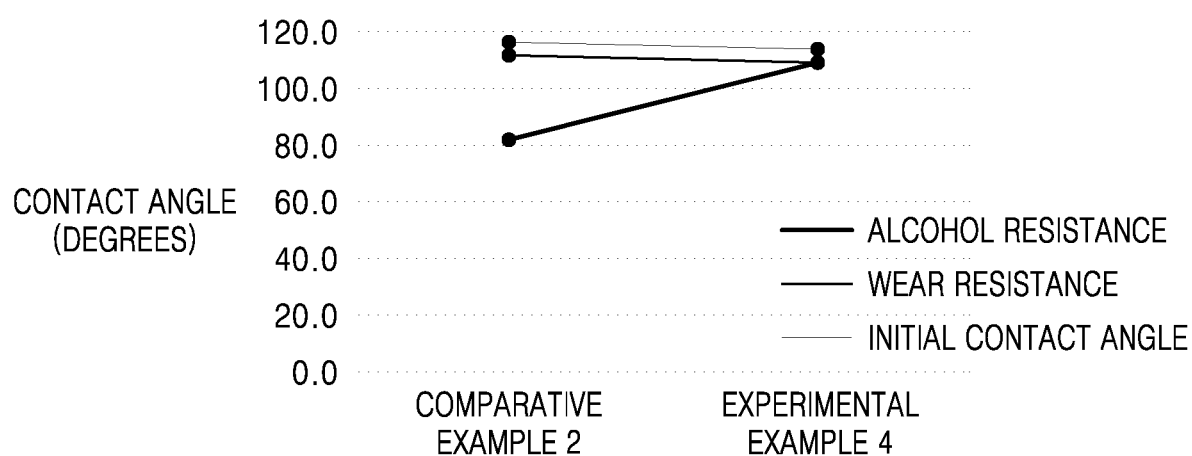
FIG. 7 is a plot of water contact angle in Comparative Example 2 and Experimental Example 4.

FIG. 7 is a plot showing a water contact angle in Comparative Example 2 and Experimental Example 4. In Comparative Example 2, a window substrate was aged at a temperature of 25° C. and a relative humidity of 85% for 48 hours, the aged window substrate was subjected to a plasma including oxygen for 60 seconds, and an anti-fingerprint layer including Si—OX (X: methoxy, ethoxy, etc.) was formed on the plasma-treated window substrate. Specifically, in Comparative Example 2, the anti-fingerprint layer was formed by using a compound in which PFPE was bonded to Si—OX, i.e., a compound that includes a PFPE group, but not a silazane group. Accordingly, the anti-fingerprint layer of Comparative Example 2 may have a structure including PFPE bonded to Si—OX.

In Experimental Example 4, a window substrate was aged at a temperature of 25° C. and a humidity of 85% for 48 hours, the aged window substrate was subjected to a plasma including oxygen for 60 seconds, and an anti-fingerprint layer was formed on the plasma-treated window substrate with a compound represented of Formula 2 below.

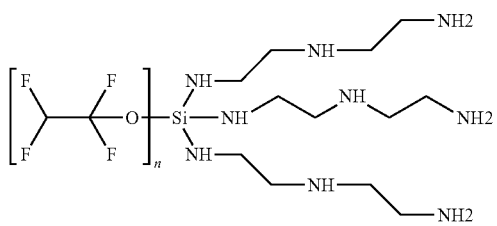

Formula 2

In Formula 2, n is an integer from 1 to 10.

The compound represented by Formula 2 corresponds to a compound has a structure including a silicon atom linked to an amino nitrogen and which is bonded to PFPE.

Accordingly, the anti-fingerprint layer of Experimental Example 4 may include a compound in which silazane having a structure including a silicon atom and an amino nitrogen linked to each other is bonded to PFPE. In contrast, the anti-fingerprint layer of Comparative Example 2 is not prepared with a compound that includes a silazane group.

An initial water contact angle evaluation, wear resistance evaluation, and alcohol resistance evaluation were performed for Comparative Example 2 and Experimental Example 4. When the water contact angle of the anti-fingerprint layer is less than 95 degrees, the window surface is determined to be unacceptable. In comparison, when the water contact angle of the anti-fingerprint layer was 95 degrees or more, the window surface was determined to be acceptable and the evaluation criteria were satisfied.

Referring to FIG. 7, the initial water contact angles of Comparative Example 2 and Experimental Example 4 were each measured to be 95 degrees or more.

In the case of Comparative Example 2, following the wear resistance evaluation, the water contact angle was measured to be 111.8 degrees, and thus, the wear resistance, water contact angle of Comparative Example 2 satisfies the evaluation criteria (for example, 95 degrees or more). However, the alcohol resistance evaluation of Comparative Example 2 does not satisfy this criteria. Instead, the water contact angle was measured to be 82 degrees. Therefore, when the anti-fingerprint layer does not include a compound having a silazane group, the alcohol resistance of the anti-fingerprint layer does not satisfy the evaluation criteria (for example, 95 degrees or more).

On the other hand, in Experimental Example 4, following the wear resistance evaluation, the water contact angle was measured to be 108.8 degrees, and thus, the wear resistance, water contact angle of Experimental Example 4 satisfies the evaluation criteria (for example, 95 degrees or more). Also, Experimental Example 4 satisfies the alcohol resistance evaluation. In this case, the water contact angle was measured to be 109.2 degrees, and thus, the alcohol resistance, water contact angle of Experimental Example 4 satisfies the evaluation criteria (for example, 95 degrees or more). Therefore, in the case of Experimental Example 4, both the wear resistance, water contact angle, and the alcohol resistance, water contact angle satisfy the evaluation criteria (for example, 95 degrees or more). In other words, when the anti-fingerprint layer includes a compound having a silazane group, the alcohol resistance of the anti-fingerprint layer is improved, whereas the anti-fingerprint layer in the absence of the silazane group shows little or no improvement in alcohol resistance.

Therefore, when the anti-fingerprint layer includes a compound having a silazane group, and includes a structure including a silicon (Si) atom and an amino nitrogen linked to each other, the alcohol resistance of the anti-fingerprint layer (or the window) may be improved.

According to an embodiment, because the window substrate is aged prior to plasma treatment, the wear resistance of the anti-fingerprint layer may be improved. Also, because the anti-fingerprint layer formed on the window includes a compound having a silazane group, the alcohol resistance of the anti-fingerprint layer may be improved.

In particular, because the window substrate is aged prior to the plasma treatment at a temperature of 20° C. to 100° C. and a humidity of 50% to 100% for 48 hours to 72 hours, the wear resistance of the anti-fingerprint layer may be improved. Also, because the anti-fingerprint layer formed on the window includes a compound having a silazane group, and includes a structure including a silicon (Si) atom and an amino nitrogen linked to each other, the alcohol resistance of the anti-fingerprint layer may be improved. Therefore, the durability (for example, the wear resistance and/or the alcohol resistance) of the window substrate and the window including the anti-fingerprint layer may be improved.

According to an embodiment, the anti-fingerprint layer may be manufactured by using a compound in which a compound having a silazane group having a structure including a silicon atom and an amino nitrogen linked to each other, and which is further bonded to PFPE.

According to an embodiment, when the anti-fingerprint layer includes a compound having a silazane group having a structure including a silicon atom and an amino nitrogen linked to each other is bonded to PFPE, the initial water contact angle of the anti-fingerprint layer may be 100 degrees or more, the water contact angle of the anti-fingerprint layer when the anti-fingerprint layer is rubbed 3,000 times (at a rate of 40 times/min) with a 1-kg rubber eraser may be 100 degrees of more, the water contact angle of the anti-fingerprint layer when the anti-fingerprint layer is rubbed 3,000 times (at a rate of 40 times/min) by using a 1-kg rubber eraser under ethyl alcohol conditions may be 100 degrees or more.

According to an embodiment, the water contact angle of the anti-fingerprint layer 200 may be 100 degrees or more. Specifically, when the window substrate 100 is aged, the aged window substrate is subjected to a plasma (for example, a plasma including oxygen), and the anti-fingerprint layer 200 is formed on the plasma treated window substrate, the water contact angle of the anti-fingerprint layer 200 may be 100 degrees or more.

Figure 8A:
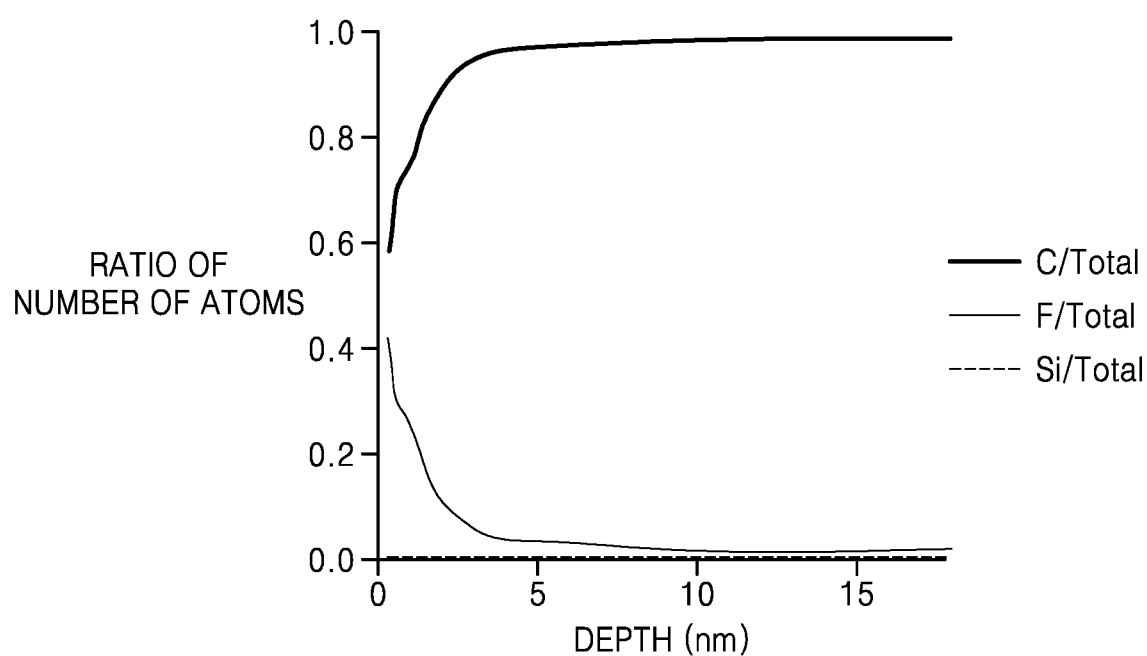
FIG. 8A is a plot showing a ratio of the number of carbon, fluorine, and silicon atoms with respect to a depth of an anti-fingerprint layer of Comparative Example 1.
Figure 8B:
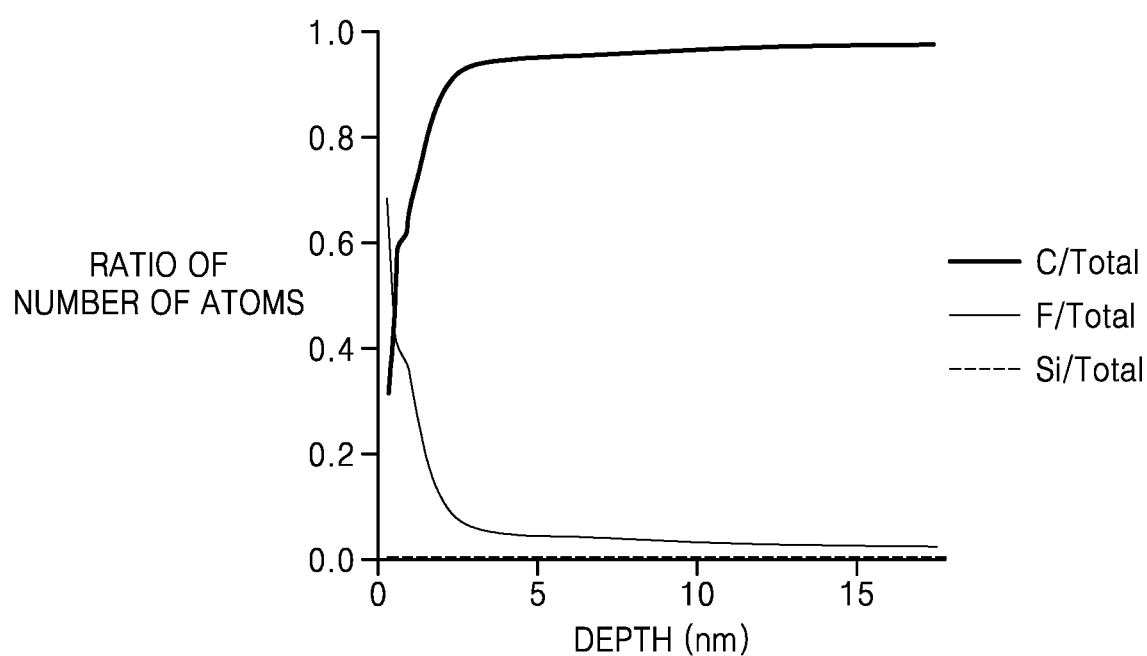
FIG. 8B is a plot showing a ratio of the number of carbon, fluorine, and silicon atoms with respect to a depth of an anti-fingerprint layer of Comparative Example 2.
Figure 8C:
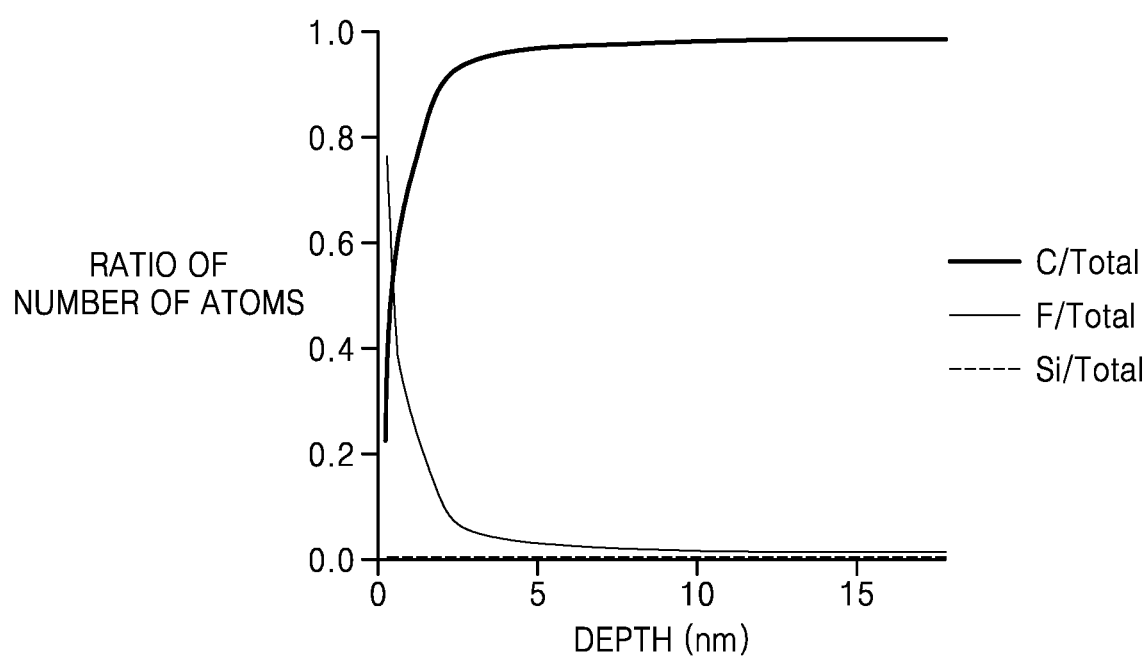
FIG. 8C is a plot showing a ratio of the number of carbon, fluorine, and silicon atoms with respect to a depth of an anti-fingerprint layer of Experimental Example 4.

FIGS. 8A, 8B, and 8C are plots showing a ratio of the number of atoms of carbon, fluorine, or silicon, with respect to a depth of an anti-fingerprint layer in Comparative Example 1, Comparative Example 2, and Experimental Example 4, respectively. The plots of FIGS. 8A, 8B, and 8C are results represent the data measured by using nanoscale secondary ion mass spectrometry with respect to a depth of an anti-fingerprint layer.

Referring to FIGS. 8A. 8B, and 8C, the number of fluorine atoms to the total number of atoms on the surface of the anti-fingerprint layer of Comparative Example 1 is about 0.419:1, a ratio of fluorine atoms to the total number of atoms on the surface of the anti-fingerprint layer of Comparative Example 2 is about 0.686:1, and a ratio of fluorine atoms to the total number of atoms on the surface of the anti-fingerprint layer of Experimental Example 4 is about 0.767:1.

When the anti-fingerprint layer 200 includes a PFPE group, the anti-fingerprint layer 200 may have fingerprint resistance and/or alcohol resistance. In particular, as the fluorine content of the surface of the anti-fingerprint layer 200 increases, the fingerprint resistance and/or the alcohol resistance of the anti-fingerprint layer 200 may be improved. In addition, the inventors observe that the efficiency of the deposition process for the forming of the anti-fingerprint layer 200 on a plasma-treated window substrate is improved with an increase in the fluorine content of a surface of the anti-fingerprint layer 200. Accordingly, if the fluorine content of the surface of the anti-fingerprint layer 200 is high, the efficiency of the deposition process for the forming of the anti-fingerprint layer 200 is shown to increase.

The fluorine content of the surface of Comparative Example 2 is higher than the fluorine content of the surface of Comparative Example 1. It is also confirmed that, when the aging process is performed on a window substrate, the fluorine content of the surface of the anti-fingerprint layer formed on an aged window substrate is increased. Therefore, when the aging process is performed on the window substrate prior to the plasma treatment, the deposition efficiency for the process of forming the anti-fingerprint layer on the window substrate may be improved.

Also, the fluorine content of the surface of Experimental Example 4 is higher than the fluorine content of the surface of Comparative Example 2. Therefore, in the case in which the anti-fingerprint layer includes a compound with a silazane group having a structure including a silicon (Si) atom and an amino nitrogen linked to each other, the fingerprint resistance and/or the alcohol resistance of the anti-fingerprint layer is improved in comparison to the case in which the anti-fingerprint layer includes Si—OX (X: methoxy, ethoxy, etc.)—Comparative Example 2.

Therefore, when the window substrate is aged, the aged window substrate is subjected to a plasma, and an anti-fingerprint layer including a compound with a silazane group is formed on the plasma-treated window substrate, the wear resistance and the alcohol resistance of the window may be improved.

According to an embodiment, the aging process is performed on the window substrate with a need for depositing a primer, and the anti-fingerprint layer is formed by using a compound including a silazane group, such that the anti-fingerprint layer has excellent wear resistance and alcohol resistance is improved.

According to an embodiment, because the durability of the window including the anti-fingerprint layer is improved, the display panel on which the display element is formed may be effectively protected from contamination sources including oil, fingerprints, and various foreign matters.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of manufacturing a window, the method comprising:
aging a window substrate for 48 hours to 72 hours;
subjecting the aged window substrate to a plasma; and
forming an anti-fingerprint layer on the plasma-treated window substrate,
wherein the anti-fingerprint layer comprises a compound represented by Formula 1;

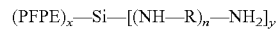

$(PFPE)_x$—Si—$[(NH—R)_n—NH_2]_y$, wherein, in Formula 1,
PFPE is a perfluoropolyether group,
R is a $C_2$-$C_{10}$ alkylene group,
x and y are each independently an integer from 1 to 3 and x+y=4, and
n is an integer from 1 to 5.

2. The method of claim 1, wherein the aging of the window substrate is performed at a temperature of about 20° C. to about 100° C.

3. The method of claim 2, wherein the aging of the window substrate is performed at a relative humidity of about 50% to about 100%.

4. The method of claim 1, wherein the plasma comprises oxygen.

5. The method of claim 4, wherein the subjecting of the aged window substrate to the plasma is performed for about 30 seconds to about 90 seconds.

6. The method of claim 1, wherein a ratio of fluorine atoms to a total number of atoms on a surface of the anti-fingerprint layer is about 0.7:1 or more.

7. The method of claim 1, wherein a water contact angle of the anti-fingerprint layer is about 100 degrees or more.

8. The method of claim 1, wherein the window substrate comprises a polymer resin.

9. The method of claim 1, further comprising forming a hard coating layer on the window substrate prior to the aging of the window substrate.

10. The method of claim 9, wherein the hard coating layer comprises at least one of an acryl compound, a silsesquioxane compound, an epoxy compound, or a urethane compound.

11. A window comprising:
an aged window substrate that is surface treated with a plasma; and an anti-fingerprint layer on the aged, plasm-treated window substrate, the anti-fingerprint layer comprising a structure including a silazane group bonded to perfluoropolyether (PFPE);

wherein the anti-fingerprint layer comprises a compound represented by Formula 1:

$(PFPE)_x-Si-[(NH-R)_n-NH_2]_y$ wherein, in Formula 1,
PFPE is a perfluoropolyether group,
R is a $C_2$-$C_{10}$ alkylene group,
x and y are each independently an integer from 1 to 3 an x+y=4, and
n is an integer from 1 to 5.

12. The window of claim 11, wherein a ratio of fluorine atoms to a total number of atoms on a surface of the anti-fingerprint layer is about 0.7:1 or more.

13. The window of claim 11, wherein a water contact angle of the anti-fingerprint layer is about 100 degrees or more.

14. The window of claim 11, wherein the window substrate comprises a polymer resin.

15. The window of claim 11, further comprising a hard coating layer disposed between the window substrate and the anti-fingerprint layer.

16. The window of claim 15, wherein the hard coating layer comprises at least one of an acryl compound, a silsesquioxane compound, an epoxy compound, or a urethane compound.

* * * * *